United States Patent
Ersoy et al.

(10) Patent No.: US 7,938,417 B2
(45) Date of Patent: May 10, 2011

(54) CONNECTOR PIECE FOR THE ARTICULATED CONNECTION OF COMPONENTS LOCATED IN THE SUSPENSION OF A VEHICLE

(75) Inventors: Metin Ersoy, Walluf (DE); Volker Grube, Diepholz (DE); Frank Nachbar, Lemförde (DE); Frank Budde, Steinfeld-Mühlen (DE); Karl-Heinz Kallwass, Hŭlsede (DE); Ulrich Bladt, Ibbenbüren (DE); Günter Lohfink, Bad Harzburg (DE); José Ramón Izquierdo Nuñez, Burgos (ES); Jesús Santiago Miguel Pérez, Burgos (ES); Esteban Cañibano Alvarez, Villablino (ES); Ignacio Lobo Casanova, Burgos (ES)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/529,591

(22) PCT Filed: Mar. 11, 2008

(86) PCT No.: PCT/DE2008/050006
§ 371 (c)(1),
(2), (4) Date: Nov. 23, 2009

(87) PCT Pub. No.: WO2008/119342
PCT Pub. Date: Oct. 9, 2008

(65) Prior Publication Data
US 2010/0084834 A1      Apr. 8, 2010

(30) Foreign Application Priority Data

Mar. 29, 2007   (DE) .................. 10 2007 015 616

(51) Int. Cl.
*B60G 3/04* (2006.01)
(52) U.S. Cl. .................. 280/124.134; 403/122
(58) Field of Classification Search ............... 280/124.1, 280/124.134; 403/119, 122, 124, 125, 132, 403/133–135
See application file for complete search history.

(56) References Cited

U.S. PATENT DOCUMENTS

| | | | |
|---|---|---|---|
| 3,549,167 A * | 12/1970 | Haverbeck | 280/124.134 |
| 3,940,161 A | 2/1976 | Allison | |
| 5,011,321 A | 4/1991 | Kidokoro | |
| 6,341,915 B1 | 1/2002 | Kammel | |
| 7,556,273 B2 | 7/2009 | Streubel et al. | |
| 2005/0225049 A1 * | 10/2005 | Michel et al. | 280/124.134 |

FOREIGN PATENT DOCUMENTS

| | | |
|---|---|---|
| DE | 38 39 855 A1 | 5/1990 |
| DE | 198 32 956 A1 | 2/2000 |
| DE | 10 2005 004 917 A1 | 8/2006 |
| EP | 1 217 233 A1 | 6/2002 |

* cited by examiner

*Primary Examiner* — Faye M. Fleming
(74) *Attorney, Agent, or Firm* — Davis & Bujold, P.L.L.C.

(57) ABSTRACT

A connecting piece for the articulated connection of components disposed in the chassis of a vehicle. The connecting piece comprises a base body (1) made out of sheet metal in which at least one through bore (3) is provided, a plastic part (13) is rigidly connected to the base body (1), and at least one articulated joint (5), comprising a housing (4), rigidly connected to the base body (1). The housing (4) is inserted into the through bore (3), in an axial direction (24), and has a housing section (22) with a radial shoulder (23) disposed outside the hole (3) and embedded in the plastic part (13), by which the housing section (22), rigidly connected to the housing (4), is axially supported on the base body (1).

20 Claims, 6 Drawing Sheets

CONNECTOR PIECE FOR THE ARTICULATED CONNECTION OF COMPONENTS LOCATED IN THE SUSPENSION OF A VEHICLE

This application is a National Stage completion of PCT/DE2008/050006 filed Mar. 11, 2008, which claims priority from German patent application serial no. 10 2007 015 616.4 filed Mar. 29, 2007.

FIELD OF THE INVENTION

The invention relates to a connecting piece for the articulated connection of components disposed in the chassis of a vehicle, comprising a base body made of sheet metal in which at least one continuous hole is provided, a plastic part rigidly connected to the base body, and at least one articulated joint which comprises a housing rigidly connected to the base body. The invention further relates to a method for producing such a connecting piece.

BACKGROUND OF THE INVENTION

In recent times, lightweight components for vehicles are increasingly developed, particularly in order to reduce fuel consumption or in order to improve driving dynamics. DE 38 39 855 A1, for example, describes a lightweight construction element that can be used for motor vehicles and has a shell-shaped basic body made of sheet metal whose interior has reinforcing ribs made of molded-on plastic. At the connecting points to the reinforcing ribs, the basic body has anchorings that are made of deformations or clearances through which the plastic extends out over the surfaces of the clearances.

Such or similar lightweight components have meanwhile also been developed for the chasses of motor vehicles. For example, from DE 10 2005 004 917 A1, a control arm component for wheel suspensions of motor vehicles is known, comprising a shell body made of steel and latticed reinforcements coupled to it made of plastic which can be molded directly onto the shell body. To this end, apertures may be provided in the shell body which are penetrated by the plastic of the latticed reinforcements. Furthermore, the shell body can be provided at least partially with bracings by the latticed reinforcements. The control arm component has a first support section which is connected to a socket of a ball-shaped coupling and a second support section which is formed by a metallic cylindrical sleeve that is connected to flank regions of the shell body. The connection of the ball-shaped coupling to the control arm component is, however, not described in this document.

One possibility for connecting an articulated joint is provided, for example, in EP 1 217 233 A1 which discloses a connecting piece having a metal body on which a ball joint is disposed. The ball joint has a plastic housing and a ball pin partially disposed therein. An end region of the metal body forms a flat profile in which a hole is provided. To this end, the hole penetrates the flat profile associated with the end region, thereby forming an annular structure. The annular structure serves to reinforce the plastic housing and is embedded therein. The housing is preferably a single-piece plastic, injection-molded part which is formed by insert molding of the end region. Furthermore, the connecting piece may be configured as a transverse control arm which is connected both to the automotive body and to one of the wheels or wheel carrier.

Due to the fact that the housing is formed by insert molding of the end region, the design variety of the housing is limited with respect to the material. Particularly if the demands placed on strength and stability are higher, it may be advantageous to produce the housing separately from the plastic injection-molded part.

SUMMARY OF THE INVENTION

Based on this state of the art, the object of the invention is to refine a connecting piece of the type mentioned above such that the installation of the housing on the base body with incorporation of the plastic part is possible, even if the housing is produced separately from the plastic part.

The connecting piece according to the invention for the articulated connection of components disposed in the chassis of a vehicle, particularly a motor vehicle, comprises a base body made of sheet metal in which at least one through bore is provided, a plastic part rigidly connected to the base body, and at least one articulated joint which comprises a housing rigidly connected to the base body, wherein the housing is inserted into the bore in an axial direction and comprises a housing section having a radial shoulder disposed outside the hole and embedded in the plastic part by means of which the housing section rigidly connected to the housing or configured as one piece therewith is axially supported on the base body. The term "radial" here shall be interpreted as a direction or orientation extending transversely, or basically transverse, to the axial direction.

In the connecting piece according to the invention, the housing is inserted into the bore of the base body and only then embedded in the plastic part. In this way, it is possible to produce the housing as a separate component and still mount it on the base body with incorporation of the plastic part. In particular, the housing may be completely, or to a significant extent, made of a material other than the plastic part. The housing is preferably made of metal.

The sheet metal may comprise a single sheet metal or be composed of a plurality of sheet metals. The sheet metal is, or the sheet metals are, thereby preferably made of steel, aluminum, magnesium, titanium, or stainless steel. Furthermore, the base body in particular has a shell-shaped configuration.

The base body preferably has a hollow-cylindrical section surrounding the bore, wherein this section rests against the outside lateral surface of a cylindrical section of the housing, and in particular is surrounded by the plastic part. In this way, greater stability of the housing attachment can be achieved. Furthermore, the housing can be pressed into the base body, particularly into the hollow-cylindrical section, such that the housing is also held non-positively on the base body. This is particularly advantageous during embedding of the housing or housing section in the plastic part, since the housing then does not have to be held additionally on the base body.

The base body is preferably entirely or partially embedded in the plastic part, whereby the base body can also be completely surrounded by the plastic part. In order to attach the plastic part to the base body, this body may comprise a plurality of apertures through which the plastic part penetrates. While molding the plastic part onto the base body, the flowable plastic can penetrate the apertures such that, after the plastic has solidified, a positive connection is established between the plastic part and the base body. Alternatively, beads may be formed in the base body into which the plastic enters or flows during molding. The beads may be provided with undercuts in which the plastic engages. It is preferred to mold the plastic part onto the base body by means of plastic injection molding.

The plastic part serves as reinforcement of the base body and preferably has a latticed structure which in particular is disposed in a shell-shaped recess of the base body. To this end, the plastic part may comprise a plurality of braces which form the latticed structure. The plastic material is preferably reinforced with fibers, such as glass fibers. A polyamide may also be used as the plastic material.

The articulated joint comprises an inner part which is located in the housing and can be moved relative thereto. The articulated joint is preferably configured as a ball joint and comprises a ball pin as the inner part which with its ball joint is supported in the housing rotatably and/or pivotally. This support can be achieved by interposing a ball socket which is disposed in the housing and is made in particular of plastic.

At a distance from the articulated joint, the connecting piece preferably comprises a second articulated joint or bearing which is rigidly connected to the base body and forms in particular an elastomer bearing or ball joint. Furthermore, at a distance from the articulated joint and the second articulated joint or bearing, a third articulated joint or bearing may be rigidly connected to the base body such that the connecting piece forms a triangular control arm. The third articulated joint or bearing may be configured, for example, as an elastomer bearing or ball joint. In addition, the second and the third bearings or articulated joints may be oriented transversely to each other.

The connecting piece according to the invention is used in particular for connecting a vehicle wheel to an automotive body of a vehicle, whereby the inner part of the ball pin preferably is, or has been, attached to the vehicle wheel, in particular to a steering knuckle or wheel carrier of the vehicle wheel. The second articulated joint or bearing is, or has been, attached to the automotive body in this case. If the third articulated joint or bearing is provided, this is, or has also been, preferably attached to the automotive body. The components disposed in the chassis of the vehicle thus comprise in particular the automotive body and the vehicle wheel or the steering knuckle or wheel carrier. If an auxiliary frame or a chassis subframe is attached on the automotive body, the connecting piece may also be attached thereto. In this spirit, the auxiliary frame and/or the chassis subframe are ascribed to the automotive body. In particular, the connecting piece forms an upper or a lower transverse control arm in a wheel suspension of the vehicle.

The invention further relates to a method for producing a connecting piece for the articulated connection of components disposed in the chassis of a vehicle, particularly a motor vehicle, wherein
sheet metal is used to form a base body having at least one through bore,
an articulated joint is inserted, with its housing, into the bore in an axial direction until a radial shoulder of the housing abuts against the base body,
a housing section of the articulated joint housing exhibiting a shoulder and disposed outside the bore is embedded in plastic, and
the plastic is rigidly connected to the base body.

The method according to the invention is preferably provided for the production of the connecting piece according to the invention and can be refined according to all embodiments described in this context. In particular, the plastic may be rigidly connected to the base body, while the housing section is embedded in the plastic. The base body is configured in particular in a shell shape.

The base body is preferably entirely or partially embedded in the plastic and may even be completely surrounded by the same. Furthermore, a plurality of apertures may be configured in the base body, the plastic penetrating these apertures. The plastic is in particular molded onto the base body. If the apertures are provided, the plastic can flow through the same during molding. After integrally forming or molding on the flowable plastic, it solidifies and forms a plastic part that is rigidly connected to the base body.

The base body is preferably made of sheet metal having a thickness of approximately 1.5 to 2 millimeters. Furthermore, the base body is reinforced by means of the plastic part, whereby this reinforcement can also be carried out only partially, particularly in regions subject to greater stress. To this end, the plastic part is preferably molded onto or by way of the connecting piece or base body. In this way, a stable and simultaneously lightweight connecting piece is created.

During the plastic injection molding operation, the plastic part and the base body can be connected to each other at multiple attachment points which are provided, for example, at the top of the connecting piece. At the attachment points, the plastic part may form "rivets" which penetrate the apertures in the base body.

Furthermore, at least one elastomer or rubber bearing may be attached to the connecting piece, whose bearing housing of this bearing exhibits a housing part made of a sheet metal which has been or is embedded in the plastic part. The embedding can take place during the plastic injection molding. For installation of the bearing, the inner part is pressed into the bearing housing together with an elastomer body which encloses the inner part.

The following advantages can be achieved in particular with the invention:
The invention is particularly well-suited for smaller motor vehicles.
Integrated production and embedding of components by plastic injection molding. Preferably, no post-processing of the connecting piece is required after the injection molding operation.
Lightweight design compared to forged control arms or control arms having several shells. Improved vehicle dynamics can be achieved.
Cost-effective design due to integrated production of the connecting piece during the installation process (plastic injection molding) and lower thickness of the sheet metal part.
Use of recyclable materials. Increase in environmental compatibility.

BRIEF DESCRIPTION OF THE DRAWINGS

The invention will be described below based on preferred embodiments with reference to the figures. The figures show.

DETAILED DESCRIPTION OF THE PREFERRED EMBODIMENTS

Figure 1:
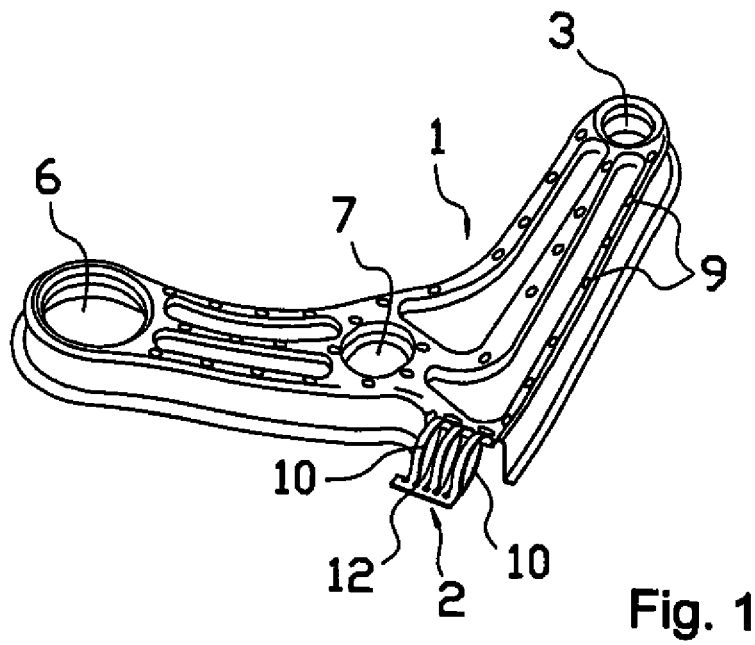
FIG. 1: A perspective view of a base body according to a first embodiment of the invention before integrally molding on the plastic part.
Figure 9:
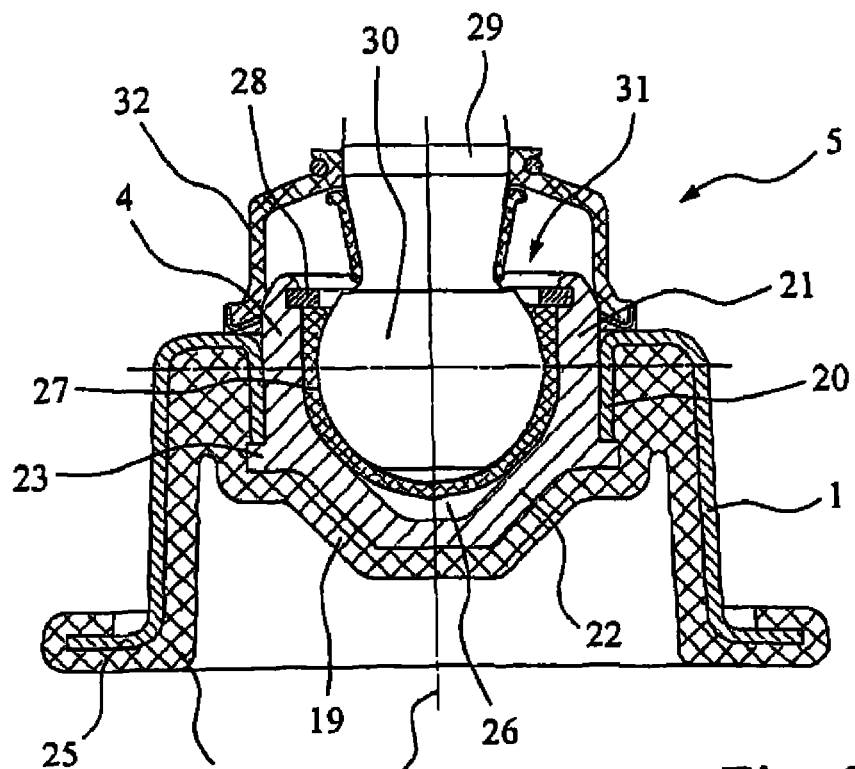
FIG. 9: A sectional view of the base body with the plastic part in the region of a ball joint.

From FIG. 1, a shell-shaped base body 1 and a housing part 2 of a connecting piece according to a first embodiment of the invention are apparent, whereby the base body 1 and the housing part 2 are made of a common sheet metal. In the base body 1, a bore 3 passing through the sheet metal is configured into which a ball joint housing 4 (see FIG. 9) of a ball joint 5 (see FIG. 9) is pressed in the assembled state of the connecting piece. Furthermore, two additional holes 6 and 7 are configured in the base body 1 which pass through the sheet metal, wherein an elastomer bearing 8 (see FIG. 10) is inserted into the hole 6. Here hole 7 is only used to pass through a coupling rod for the roll stabilizer. Additionally, a plurality of small perforations 9 is provided in the base body 1 which pass through the sheet metal.

The housing part 2 comprises a plurality of metal strips 10 which are disposed next to each other and are alternately bent in mutually opposed directions and are respectively configured in an approximately semi-circular shape. The housing part 2 surrounds an inner space 11 (see FIG. 2), wherein each metal strip 10 only partially surrounds the inner space 11. Furthermore, two directly adjoining metal strips 10 extend around the inner space 11 from different sides. At their ends facing the base body 1, the metal strips 10 transition into the base body 1. At their ends facing away from the base body, the metal strips 10 transition into a connecting strip 12 which in particular is formed by the sheet metal and connects the metal strips 10 to each other at the their ends facing away from the base body 1.

Figure 2:
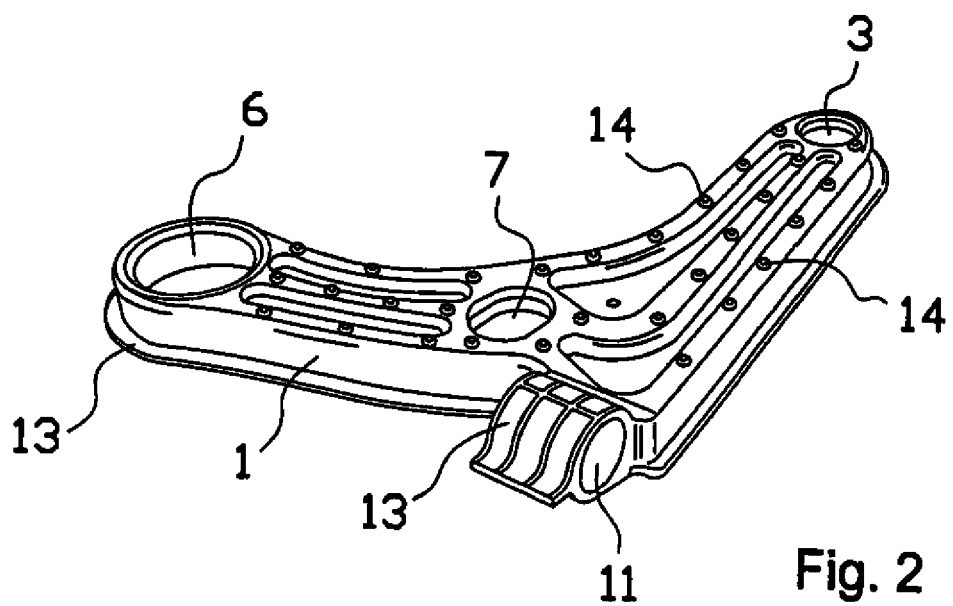
FIG. 2: A perspective top view of the base body with the plastic part.

By way of plastic injection molding, a plastic part 13 is molded onto the base body 1, whereby the housing part 2 is embedded into the plastic 13. FIG. 2 shows a perspective top view, and FIG. 3 a perspective bottom view of the base body 1 with the plastic part 13. During the molding process, the plastic 13 in the flowable state penetrates the perforations 9 and, after solidifying, forms rivets 14 which positively fix the plastic part 13 to the base body 1. Furthermore, during the injection molding operation the ball joint housing 4 is embedded in the plastic 13, which is described with reference to FIG. 8 and FIG. 9. For clarity, the ball joint 5 is not shown in FIGS. 1 to 8.

Figure 4:
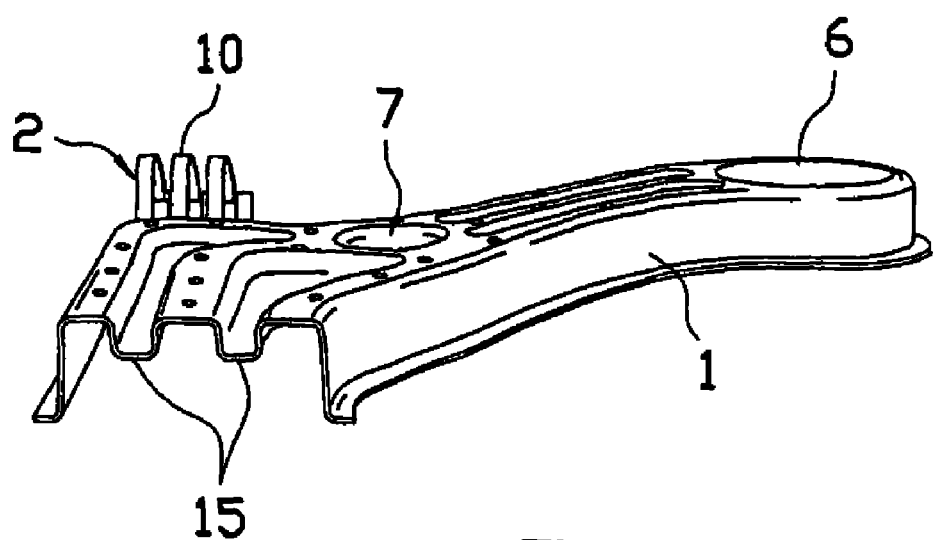
FIG. 4: A perspective sectional view of the base body before integrally molding on the plastic part.
Figure 5:
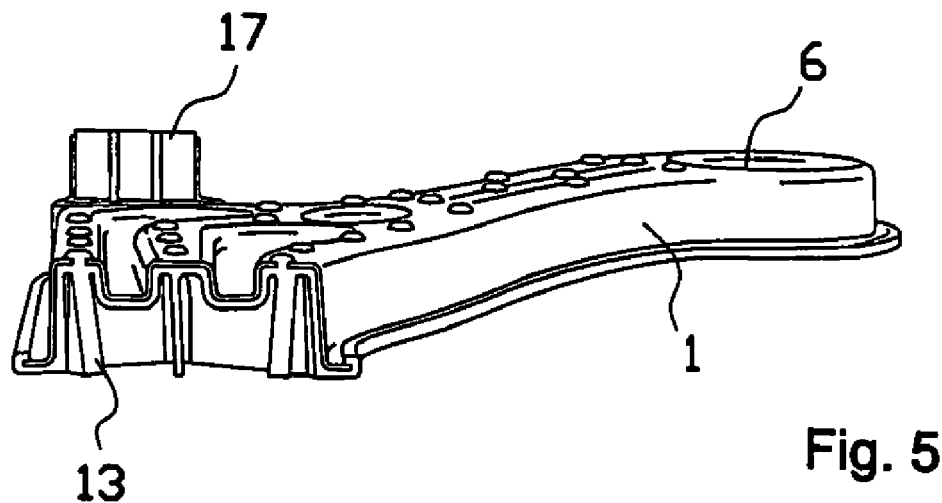
FIG. 5: A perspective sectional view of the base body with the plastic part.

FIG. 4 shows a perspective sectional view of the base body according to FIG. 1 without the plastic part 13. The shell-shaped structure of the base body 1 is clearly apparent which at its top is provided with a profiling exhibiting a plurality of depressions 15. FIG. 5 shows the cut view according to FIG. 4 with the plastic part 13. Furthermore, an enlarged view of the cut surface according to FIG. 5 is apparent from FIG. 6.

Figure 3:
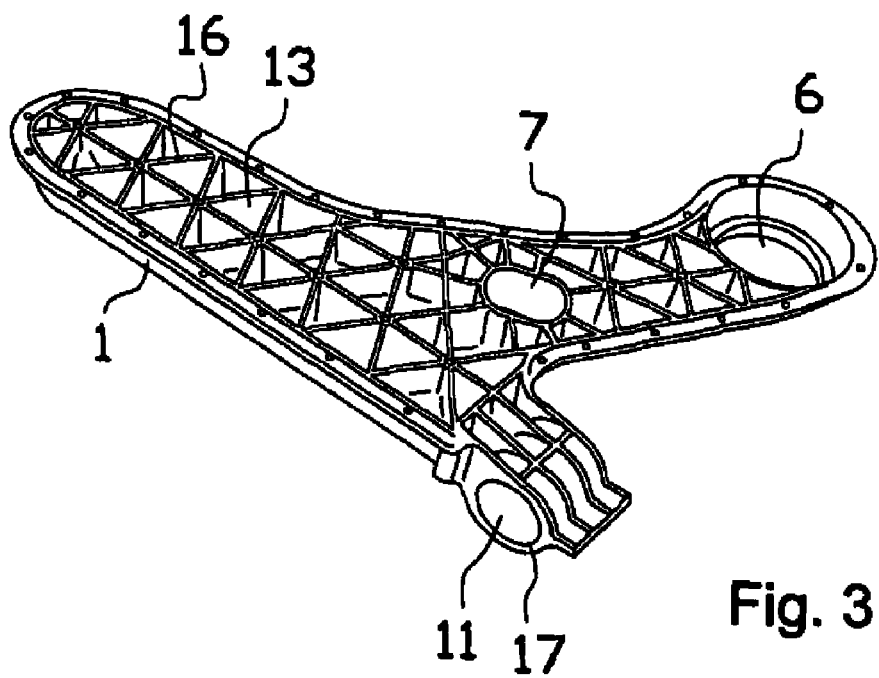
FIG. 3: A perspective bottom view of the base body with the plastic part.
Figure 6:
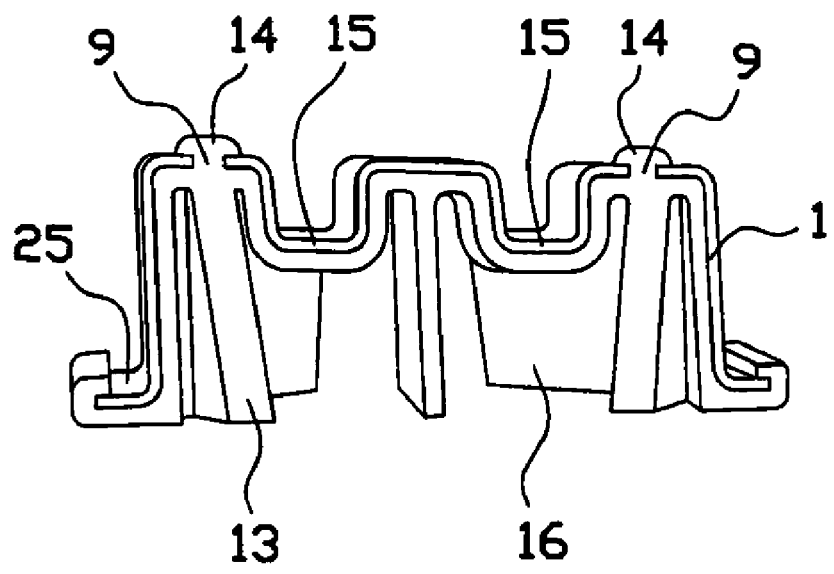
FIG. 6: An enlarged detailed view of the section according to FIG. 5,
FIG. 7: A perspective sectional view of the base body with the plastic part in the region of the elastomer bearing housing.

The plastic part 13 is disposed in the shell-shaped recess of the base body 1 and forms a latticed structure 16 reinforcing the same (see FIG. 3). Furthermore, the plastic part 13, together with the housing part 2, forms a housing 17 of an elastomer bearing 18 encompassing the recess 11 (see FIG. 10). FIG. 6 shows how the plastic part 13 extends through the perforations 9 and forms the rivets 14.

Figure 7:
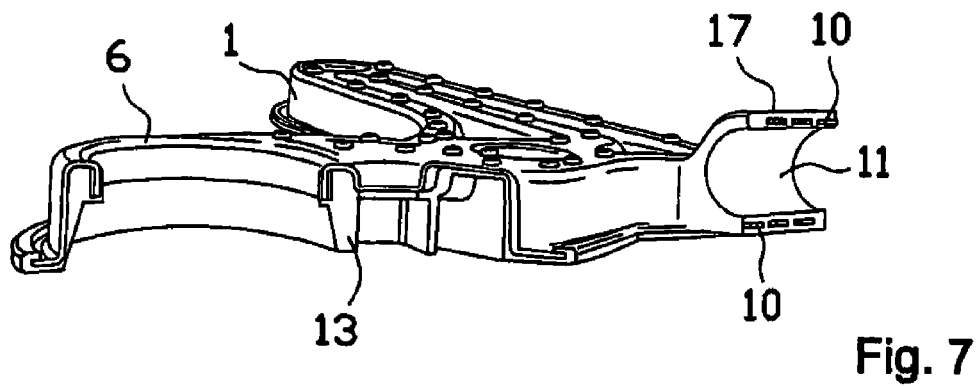

From FIG. 7, a sectional view of the base body 1 with the plastic part 13 in the region of the hole 6 and the housing 17 is apparent. For configuring the elastomer bearing 18, an inner part is introduced or pressed into the inner space 11, together with an elastomer body encompassing this part.

Figure 8:
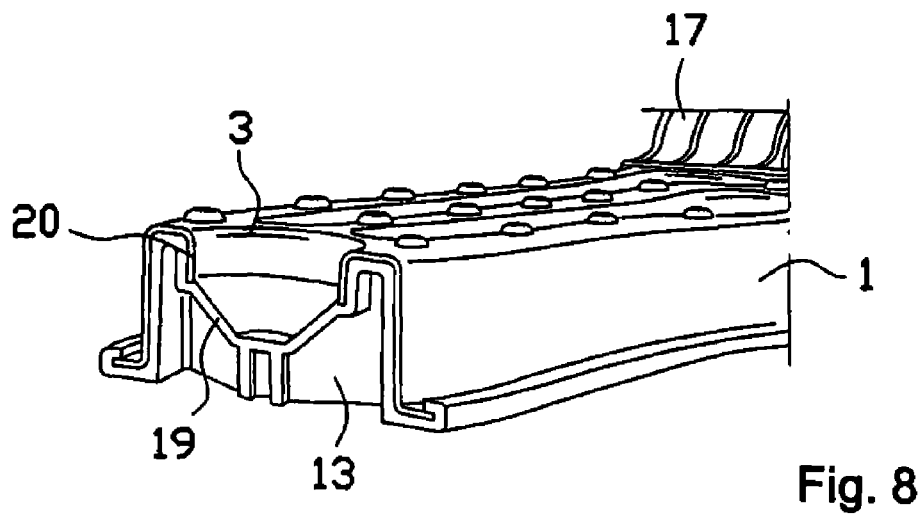
FIG. 8: A perspective sectional view of the base body with the plastic part in the region of the ball joint holder.

FIG. 8 shows a sectional view of the base body 1 with the plastic part 13 in the region of the bore 3, whereby the plastic body 13 forms a funnel-shaped section 19 which supports the ball joint housing 4. A sectional view of the ball joint 5 in the mounted state is apparent from FIG. 9, wherein the base body 1 has a hollow-cylindrical section 20 encompassing the bore 3 in which a cylindrical section 21 of the ball joint housing 4 is pressed. Furthermore, the ball joint housing 4 comprises a section 22 which is embedded into the plastic part 13 and provided with an annularly extending radial shoulder 23 that rests against the free or front end of the hollow-cylindrical section 20. In this way, the ball joint housing 4 is supported in an axial direction 24 in an orientation on the base body 1. The ball joint housing 4 is supported in the axial direction 24 on the funnel-shaped section 19 of the plastic part 13 in the opposite orientation, such that the ball joint housing 4 is fixed in the axial direction 24 on the base body 1 with respect to both orientations. Moreover, it is apparent that the plastic part 13 extends around a peripheral edge 25 of the base body 1. In this way, the base body 1 in addition to the rivets 14 is rigidly connected to the plastic part 13.

The ball joint housing 4 exhibits a recess 26 in which a bearing shell 27 is seated that is non-rotatably fixed in the housing 4 by means of a locking ring 28. In the bearing shell or ball socket 27, a ball pin 29 with its joint ball 30 is rotatably and pivotally supported and extends through a housing opening 31 out of the ball joint housing 4. In addition, a flexible bellows seal 32 which extends up to the ball pin 29 and rests against the same outside the housing 4 is attached to the housing 4.

Figure 10:
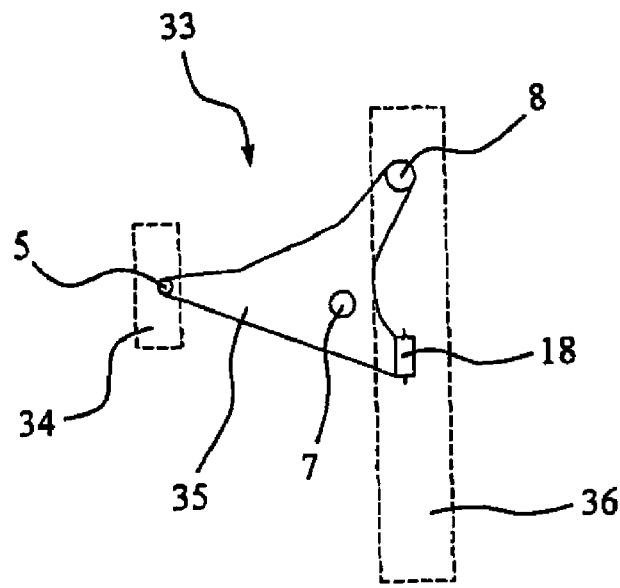
FIG. 10: A schematic view of a wheel suspension of a motor vehicle comprising the connecting piece according to the first embodiment.

FIG. 10 shows a schematic illustration of a wheel suspension 33 of a motor vehicle, whereby a vehicle wheel 34 is articulated on an automotive body 36 by means of the connecting piece 35 according to the first embodiment. To this end, the connecting piece 35 forms a triangular control arm encompassing the base body 1 and the housing 2, which control arm is produced and configured in accordance with the above description. In particular, the ball pin 29 is attached to the vehicle wheel 34 or to a steering knuckle or wheel carrier of the vehicle wheel 34. Moreover, the inner part of the elastomer bearing 18 is attached to the automotive body 36. The elastomer bearing 8 also features an inner part attached to the automotive body 36, which with the interposition of an elastomer body is disposed movably in a housing that is rigidly connected to the base body 1. The elastomer bearing 18 here is oriented transversely to the elastomer bearing 8 such that the elastomer bearing 18 can also be referred to as a horizontal elastomer bearing and the elastomer bearing 8 as a vertical elastomer bearing. The elastomer bearing 8 is pressed into the hole 6.

Figure 11:
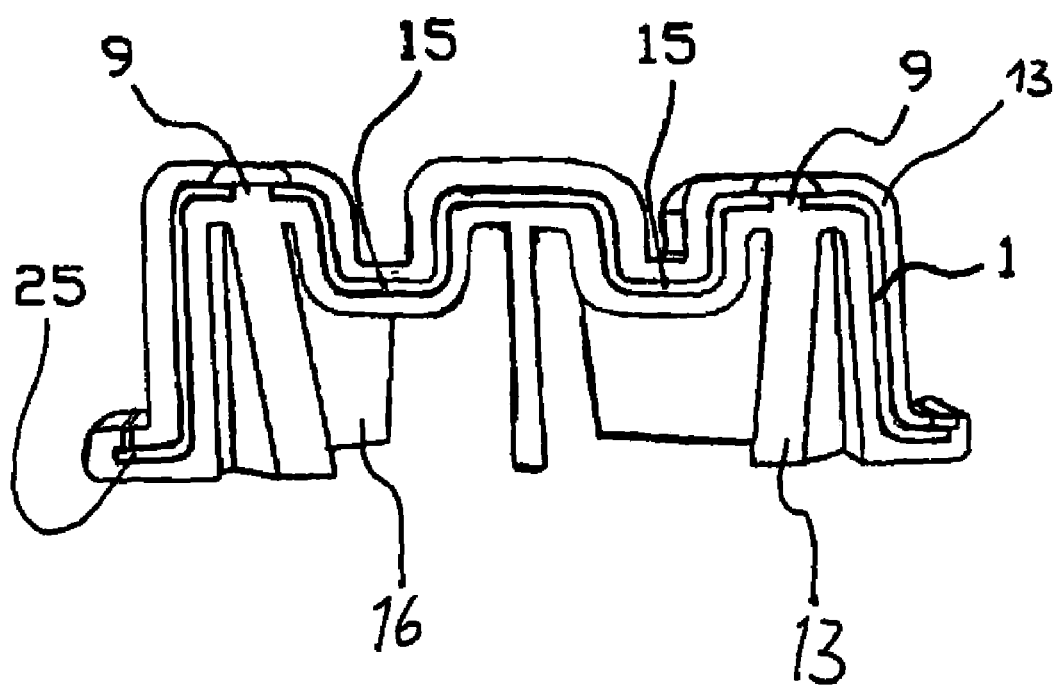
FIG. 11: A sectional view of the base body with the plastic part according to a second embodiment of the invention.

Apparent from FIG. 11 is the base body 1 with the plastic part 13 according to a second embodiment of the invention, whereby characteristics identical or similar to the first embodiment are denoted with the same reference numerals as in the first embodiment. According to the second embodiment, the base body 1 is embedded on both sides or almost completely into the plastic part 1. Apart from that, the second embodiment agrees with the first embodiment.

LIST OF REFERENCE CHARACTERS

1 Base body
2 Housing Part
3 Bore
4 Ball joint housing

5 Ball joint
6 Hole
7 Hole
8 Bearing
9 Perforation
10 Metal strip
11 Inner space
12 Connecting strip
13 Plastic
14 Rivet
15 Depression
16 Latticed structure
17 Housing
18 Elastomer bearing
19 Funnel-shaped section
20 Hollow-cylindrical section
21 Cylindrical section
22 Embedded section
23 Radial shoulder
24 Axial direction
25 Edge
26 Recess
27 Bearing shell/ball socket
28 Locking ring
29 Ball pin
30 Joint ball
31 Aperture
32 Bellows seal
33 Wheel suspension
34 Vehicle wheel
35 Connecting piece
36 Automotive body

The invention claimed is:

1. A connecting piece for articulated connection of components disposed in a chassis of a vehicle, the connecting piece comprising:
a base body (1) made of sheet metal having at least one through bore (3) therein, and a hollow-cylindrical section (20) defining the at least one through bore (3) and the hollow-cylindrical section (20) forming a stop surface,
at least a first articulated joint (5) comprising a housing (4), the housing (4) having a radial shoulder (23), the housing (4) being inserted into the through bore (3), in an axial direction (24), such that the radially shoulder (23) of the housing (4) engages with the stop surface of the hollow-cylindrical section (20),
a plastic part (13) being rigidly connected to the base body (1) and surrounding the housing (4), and the plastic part (13) being integrally connected with the base body (1) so as to prevent axial movement of the housing (4), along the axial direction (24), away-from the hollow-cylindrical section (20) of the base body (1).

2. The connecting piece according to claim 1, wherein the housing (4) is made of metal.

3. The connecting piece according to claim 1, wherein the housing (4) is pressed into the hollow-cylindrical section (20) of the base body (1) and retained therein by the plastic part (13).

4. The connecting piece according to claim 1, wherein the base body (1) is at least partially embedded in the plastic part (13) so that the base body (1) and the plastic part (13) form and unitary structure.

5. The connecting piece according to claim 1, wherein the base body (1) comprises a plurality of apertures (9) in a surface thereof through which the plastic part (13) penetrates and the penetration of the plastic part forms at plurality of rivets for positively securing the base body (1) to the plastic part (13).

6. The connecting piece according to claim 1, wherein the first articulated joint (5) is a ball joint and features a ball pin (29) which with the joint ball (30) is rotatably and pivotally supported in the housing (4).

7. The connecting piece according to claim 1, wherein at least a second articulated joint or bearing (18) is rigidly connected to the base body (1) and spaced from the first articulated joint (5), and the second articulated joint or bearing (18) defines a pivot axis which extends substantially normal to the axial direction (24) of the first articulated joint (5).

8. The connecting piece according to claim 7, wherein the second bearing (18) is an elastomer bearing.

9. The connecting piece according to claim 7, wherein a third articulated joint or bearing (8) is rigidly connected to the base body (1) and spaced from the first articulated joint (5) and also spaced from the second articulated joint or bearing (18), and the connecting piece (35) forms a triangular control arm for a motor vehicle.

10. The connecting piece according to claim 1, wherein the plastic part (13) overlaps a peripheral edge of the base body (1) and the overlap of the peripheral edge of the plastic part (13) facilitates a rigid and secure connection of the base body (1) with the plastic part (13).

11. The connecting piece according to claim 1, wherein the base body (1) comprises a plurality of metal strips (10) which are connected with a connecting strip (12) and the plastic part (13) is molded over at least the metal strips (10) to form a housing (17) which accommodates an elastomer bearing of the second articulated joint or bearing (18).

12. The connecting piece according to claim 11, wherein the bearing housing (17), which accommodates the elastomer bearing, extends substantially normal to the axial direction (24) of the first articulated joint (5), and
forming a portion of the plastic part (13), which supports the ball joint housing (4), into a funnel-shaped section (19).

13. The connecting piece according to claim 1, wherein the plastic part (13) forms a latticed structure which reinforces the plastic part (13) which supports the housing (4) and assists with retaining the first articulated joint (5) within the at least one through bore (3); and
the plastic part (13) forms a funnel-shaped section (19) which supports the ball joint housing (4).

14. A connecting piece for articulated connection of components disposed in a chassis of a vehicle; the connecting piece comprising:
a base body (1) made of sheet metal having at least one through bore (3) therein, and a hollow-cylindrical section (20) defining the at least one through bore (3) and forming a stop surface,
at least a first articulated joint (5) comprising a housing (4) with a radial shoulder (23), the housing (4) being accommodated within the through bore (3) such that the radially shoulder (23) of the housing (4) directly engages with the stop surface of the hollow-cylindrical section (20) so as to prevent further movement of the first articulated joint (5) in an axial direction, and
a plastic part (13) being molded and rigidly and integrally connected with the base body (1), the plastic part (13) surrounding the housing (4) so as prevents axial movement of the housing (4), along the axial direction (24), away from the hollow-cylindrical section (20) of the base body (1), and sandwich the radially shoulder (23) of the housing (4) between the hollow-cylindrical section (20) and the plastic part (13).

15. A method for producing a connecting piece for articulated connection of components disposed in a chassis of a vehicle, the method comprising the steps of:
    forming a base body (1) having at least one through bore (3) formed from a sheet metal;
    inserting an articulated joint (5) and a housing (4) into the through bore (3), in an axial direction (24), until a radial shoulder (23) of the housing (4) abuts against the base body (1) so as to prevent further movement of the housing (4) in the axial direction (24); and
    embedding a housing section (22) of the housing (4), having the shoulder (23), in plastic (13) so as to rigidly connect the plastic (13) to the base body (1) and sandwich the shoulder (23) between the base body (1) and the plastic (13).

16. The method according to claim 15, further comprising the step of at least partially embedding the base body (1) in the plastic (13).

17. The method according to claim 15, further comprising the step of forming a plurality of apertures (9) in the base body (1) and penetrating the plastic (13) through the plurality of apertures (9) in the base body (1) and rigidly connect the plastic (13) to the base body (1).

18. The method according to claim 15, further comprising the step of molding the plastic (13) onto the base body (1) so that the base body (1) and the plastic part (13) form and unitary structure.

19. The method according to claim 15, further comprising the step of directly abutting the radially shoulder (23) of the housing (4) against a stop surface of the hollow-cylindrical section (20).

20. The method according to claim 15, further comprising the step of directly abutting the radially shoulder (23) of the housing (4) against a stop surface of the hollow-cylindrical section (20);
    providing the base body (1) with a plurality of spaced apart perforations;
    causing the plastic part (13) to penetrate the plurality of spaced apart perforations and form a plurality of spaced apart rivets perforations for connecting the base body (1) to the plastic part (13); and
    overlapping a peripheral edge of the base body (1) with the plastic part (13) to from and secure connection of the base body (1) with the plastic part (13).

* * * * *